United States Patent
Jain et al.

(10) Patent No.: US 12,506,680 B2
(45) Date of Patent: Dec. 23, 2025

(54) SERVICE BORDER ROUTING BASED ON LOCATION IN MULTISITE FABRIC NETWORKS

(71) Applicant: Cisco Technology, Inc., San Jose, CA (US)

(72) Inventors: Prakash C. Jain, Fremont, CA (US); Balaji Pitta Venkatachalapathy, San Ramon, CA (US); Malathi A. Srinivasan, Union City, CA (US); Sanjay K. Hooda, Pleasanton, CA (US); Victor Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 592 days.

(21) Appl. No.: 17/809,343

(22) Filed: Jun. 28, 2022

(65) Prior Publication Data
US 2023/0421481 A1     Dec. 28, 2023

(51) Int. Cl.
*H04L 45/12*     (2022.01)
*H04L 45/64*     (2022.01)

(52) U.S. Cl.
CPC ............ *H04L 45/126* (2013.01); *H04L 45/64* (2013.01)

(58) Field of Classification Search
CPC ... H04L 45/126; H04L 45/64; H04L 67/1021; H04W 40/20
See application file for complete search history.

(56) References Cited

U.S. PATENT DOCUMENTS

| 7,543,045 | B1 | 6/2009 | Agrawal et al. |
| 11,233,822 | B2 | 1/2022 | Hooda et al. |
| 2009/0199198 | A1* | 8/2009 | Horii ................ A63F 13/352 718/104 |
| 2015/0074227 | A1 | 3/2015 | Ling et al. |
| 2015/0188802 | A1 | 7/2015 | Yoon et al. |
| 2017/0339623 | A1* | 11/2017 | Pillay-Esnault ........ H04L 45/74 |
| 2018/0069934 | A1 | 3/2018 | Jurgenson et al. |
| 2019/0081890 | A1* | 3/2019 | Ravindran ............ H04L 45/741 |
| 2020/0162282 | A1 | 5/2020 | Ashtaputre et al. |

(Continued)

OTHER PUBLICATIONS

Meraki.com, "Placing Devices on the Map in Dashboard," Cisco Systems, Inc., Dated Oct. 5, 2020, pp. 1-6.

(Continued)

*Primary Examiner* — Asad M Nawaz
*Assistant Examiner* — Najeeb Ansari
(74) *Attorney, Agent, or Firm* — Patterson + Sheridan, LLP (57) ABSTRACT

Techniques for communication network routing include receiving, at a routing device associated with a first site in an overlay communication network, a dynamic parameter value associated with each of a plurality of additional sites in the overlay communication network. The plurality of additional sites are each configured to provide a first network service for a computing device in the first site. A second site in the overlay communication network is selected, from among the plurality of additional sites, based on a first dynamic parameter value associated with the first site and a received second dynamic parameter value associated with the second site. The first network service is provided from the second site for the computing device, based on the selecting the second site.

15 Claims, 7 Drawing Sheets

(56) References Cited

U.S. PATENT DOCUMENTS

| | | |
|---|---|---|
| 2020/0204483 A1 | 6/2020 | Jain et al. |
| 2021/0092616 A1 | 3/2021 | Desai et al. |
| 2021/0112480 A1 | 4/2021 | Pillay-Esnault |
| 2021/0135984 A1 | 5/2021 | Jain et al. |
| 2022/0007251 A1* | 1/2022 | Allan .................... H04W 76/30 |
| 2022/0070716 A1* | 3/2022 | Yan ................... H04W 28/0925 |

OTHER PUBLICATIONS

Cisco.com, "Cisco Catalyst IR 1800 Rugged Series Router Software Configuration Guide: Chapter: Configuring GPS," Dated May 25, 2022, pp. 1-30.

International Search Report and Written Opinion for International Application No. PCT/US2023/068788, mailed Oct. 10, 2023, 16 Pages.

* cited by examiner

SERVICE BORDER ROUTING BASED ON LOCATION IN MULTISITE FABRIC NETWORKS

Embodiments presented in this disclosure generally relate to electronic communication networks. More specifically, one or more embodiments disclosed herein relate to service border routing based on location in multisite fabric networks.

BACKGROUND

Multisite fabric networks (e.g., software defined access (SDA) fabric networks) often include service borders leading to sites that provide various network services. For example, service borders can be used by a given site in the network to access another site that provides a wide area network (WAN) connection (e.g., a connection to the Internet), firewall services, dynamic host configuration protocol (DHCP) services, domain name system (DNS) services, multicast DNS (mDNS) services, cloud services, and a variety of other network services. Service borders, however, can be located across site boundaries in different sites, and can lead to sites that offer different services. No suitable technique exists to select site service borders based on location (e.g., geographic location) in a multisite fabric network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes receiving, at a routing device associated with a first site in an overlay communication network, a dynamic parameter value associated with each of a plurality of additional sites in the overlay communication network. The plurality of additional sites are each configured to provide a first network service for a computing device in the first site. The method further includes selecting a second site in the overlay communication network, from among the plurality of additional sites, based on a first dynamic parameter value associated with the first site and a received second dynamic parameter value associated with the second site. The method further includes providing the first network service from the second site for the computing device, based on the selecting the second site.

Embodiments further include a system, including a processor and a memory having instructions stored thereon which, when executed on the processor, performs an operation. The operation includes receiving, at a routing device associated with a first site in an overlay communication network, a dynamic parameter value associated with each of a plurality of additional sites in the overlay communication network. The plurality of additional sites are each configured to provide a first network service for a computing device in the first site. Embodiments further include selecting a second site in the overlay communication network, from among the plurality of additional sites, based on a first dynamic parameter value associated with the first site and a received second dynamic parameter value associated with the second site. Embodiments further include providing the first network service from the second site for the computing device, based on the selecting the second site.

Embodiments further include a non-transitory computer-readable medium having instructions stored thereon which, when executed by a processor, performs an operation. The operation includes receiving, at a routing device associated with a first site in an overlay communication network, a dynamic parameter value associated with each of a plurality of additional sites in the overlay communication network. The plurality of additional sites are each configured to provide a first network service for a computing device in the first site. The operation further includes selecting a second site in the overlay communication network, from among the plurality of additional sites, based on a first dynamic parameter value associated with the first site and a received second dynamic parameter value associated with the second site. The operation further includes providing the first network service from the second site for the computing device, based on the selecting the second site.

Example Embodiments

A multisite fabric network often includes a combination of provider sites and user sites. Provider sites can be access by service borders, and can provide various network services (e.g., a connection to the Internet, firewall services, DHCP services, DNS services, mDNS services, cloud services, and a variety of other network services). User sites do not include, locally, at least some network services. Users seeking to access those missing network services from a user site must access the network services through a provider site (e.g., through a service border for a provider site). A given site can be considered a user site as to some network services (i.e., network services not available locally) and a provider site as to other network services (i.e., network services that are available locally and can be offered to other sites).

For a user site to access a network service that is unavailable locally, the user site must select a provider site service border that offers the service. In existing solutions, a given user site selects a provider site offering a desired network service based on static routing device priority. For example, in a Locator ID Separation Protocol (LISP) network architecture, a user site typically selects a provider site based on a static service routing locator (RLOC) priority. This can work sufficiently where only a single provider site offers the desired service, but it does not work well to select among multiple options for provider sites.

For example, because service border RLOC priority is usually configured statically, it can only be allocated in one way suitable only for one user site. But in multisite fabric networks, there are often multiple user sites desiring a given network service (e.g., subscribing to the service), and the network service is often offered by multiple provider sites. Existing techniques typically do not take into account geographic location of user sites relative to provider sites, and do not select a provider site that is closest in geographic location to a user site. This is because overlay tunnels to service borders are formed using a map-server or centralized control plane and not based on parameters like distance, cost, or metrics as provided by the underlay routing protocols. Also, it is very difficult for a user site to use the underlay parameters to choose a provider site based on proximity of the provider site service border, because the underlay routing path changes frequently and it is very hard to track and reflect those changes in the overlay space to select a provider site based on proximity.

Further, in existing solutions, service borders are typically configured in redundancy or load balancing modes. So even if it were possible for a user site to choose a service border based on underlay route metrics, the chosen service border itself might be down (e.g., unavailable to provide the desired service) while its underlay route or subnet suggests it is available. Other service borders might be available, but have an underlay routing path that is not optimal. This makes proximity border selection using underlay very difficult. Further, it is even more difficult if service borders themselves are changing dynamically due to availability of services, load balancing across many service borders, hybrid services, multipath link congestions, quality of service (QoS) considerations, bandwidth considerations, and other suitable factors.

One or more techniques described herein allow a user site to choose the service border of a provider site based on the proximity of the service border to the user site, the location of the service border, or any other dynamic parameter value (e.g., overriding static priority in existing solutions). For example, the location of a given user site and provider site can be identified using any number of techniques (e.g., using a global positioning system (GPS) device in a given routing device, WiFi or cellular radio (e.g., 5G) based location identification, using a map application programming interface (API) from a controller application, user configuration, or any other suitable technique). This location information (e.g., a latitude and longitude of the location) can be carried by an overlay protocol (e.g., in a vendor specific element for the LISP protocol) to a map server, and can be stored by the map server and transmitted to user sites to identify provider site service borders based on location for a given user site. The user site can select a preferred provider site, using the location information and any other suitable criteria. This is discussed further below with regard to FIGS. 3-6.

Figure 1:
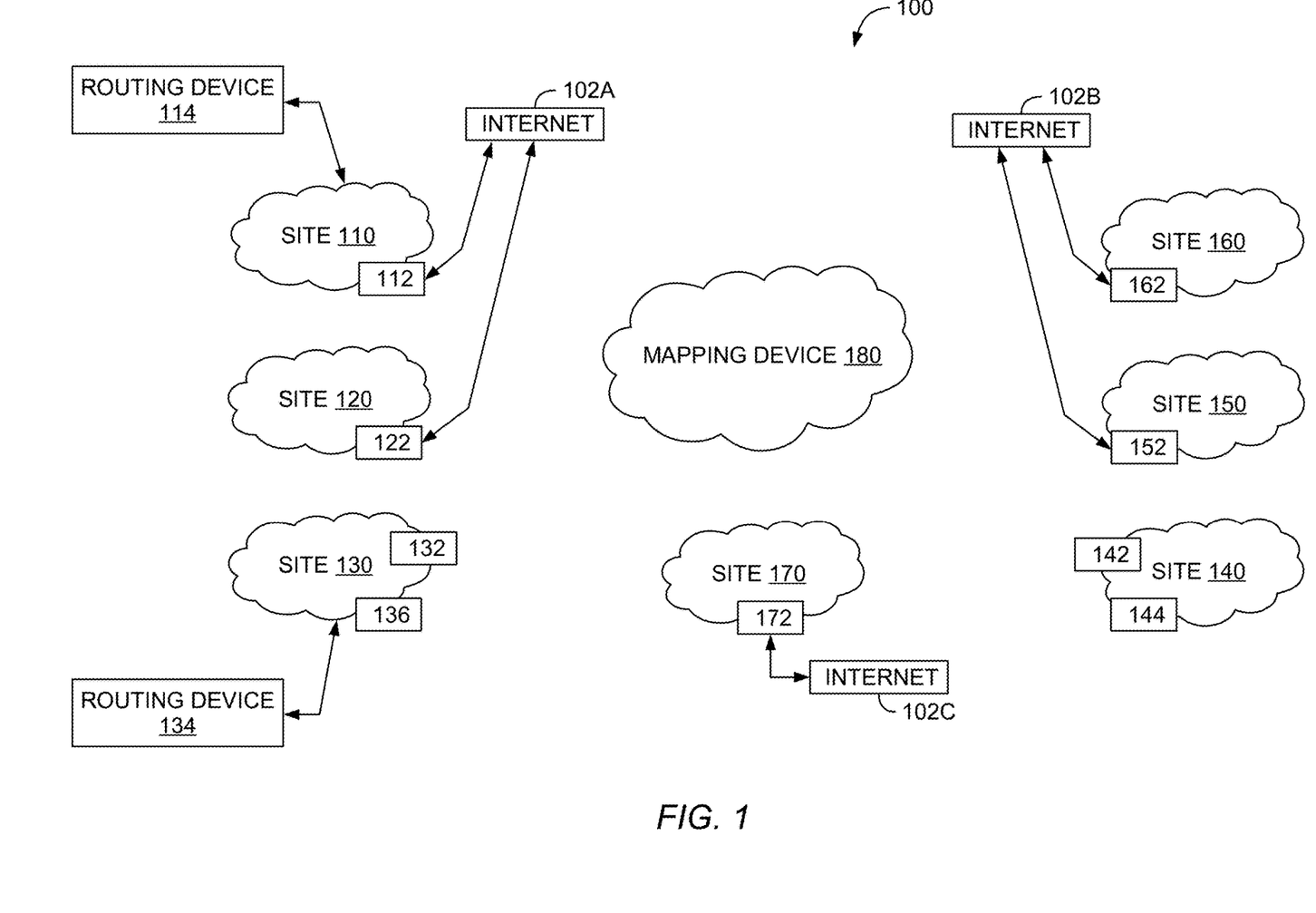
FIG. 1 illustrates a multisite fabric network computing environment for service border routing, according to one embodiment.

FIG. 1 illustrates a multisite fabric network computing environment 100 for service border routing, according to one embodiment. In an embodiment, the computing environment 100 includes a number of sites 110, 120, 130, 140, 150, 160, and 170. These sites can be located at different geographic locations around the world (e.g., different cities, states, countries, etc.). In an embodiment, network traffic is routed among the sites 110, 120, 130, 140, 150, 160, and 170 using a suitable overlay network (e.g., a network using the LISP protocol).

In an embodiment, LISP is a network architecture and protocol that implements the use of two namespaces instead of a single internet protocol (IP) address. For example, LISP can use endpoint identifiers (EIDs) assigned to end hosts, and RLOCs assigned to devices in a routing system (e.g., routers). A LISP network can include a variety of components, including one or more edge devices (e.g., an egress tunnel router (ETR) or ingress tunnel router (ITR)), one or more borders (e.g., a proxy ETR (PETR) or proxy ITR (PITR)), and a fabric control plane (e.g., including a map resolver (MR), a map server (MS), or both).

In an embodiment, a LISP network architecture does not require pre-populating routing information throughout the network. This avoids using resources up front (e.g., hardware resources) to populate the routing information. Instead, the first time a device in the LISP architecture transmits a packet, the device can transmit a request to a mapping device (e.g., an MR or MS) for routing information. The mapping device can respond by identifying both the endpoint (e.g., using an EID) and routing information (e.g., RLOC).

For example, the mapping device can be associated with a given site or group of sites, and can include a mapping for every destination within that site or group of sites. To transmit between sites, the mapping server can identify a site border and a route from the egress of the source site to the ingress of the destination site. A mapping device associated with the destination site can then route the packet from the ingress border of the destination site to the destination device. LISP is merely one example, and one or more techniques discussed herein can be used with any suitable overlay network (e.g., a border gateway protocol Ethernet virtual private network (BGP-EVPN) network architecture or any other suitable network architecture).

In an embodiment, network traffic is routed between the sites 110, 120, 130, 140, 150, 160, and 170 using the respective borders 112, 122, 132, 136, 142, 144, 152, 162, and 172, and a mapping server 180. For example, the borders 112, 122, 132, 136, 142, 144, 152, 162, and 172 can be service borders in a LISP network architecture (e.g., ITRs and ETRs) and the mapping device 180 can be both an MS and an MR in the LISP network architecture.

In an embodiment, different sites 110, 120, 130, 140, 150, 160, and 170 can offer different network services. For example, the sites 110 and 120 can offer an Internet connection 102A, the sites 150 and 160 can offer another Internet connection 102B, and the site 170 can offer another Internet connection 102C. The sites 130 and 140 may not have an available Internet connection. Thus, for a device located at the site 130 to reach the Internet, it must communicate with one of the sites 110, 120, 150, 160, or 170 to use one of the Internet connections 102A, 102B, or 102C. As discussed above, this makes the sites 130 and 140 user sites with respect to an Internet connection, while the sites 110, 120, 150, 160, and 170 are provider sites with respect to an Internet connection.

As discussed further below with regard to FIGS. 3-7, a user site (e.g., the sites 130 or 140) can use location information to select a provider site. In an embodiment, each of the provider sites 110, 120, 150, 160, and 170 can identify their location and can transmit their location to the mapping device 180. This is discussed further, below, with regard to FIG. 3. The mapping device 180 can store the location along with the available services for each provider site.

For example, assume the provider site 110 is the closest suitable provider site to the user site 130. A routing device 114, associated with the provider site 110, can identify its location and transmit the location to the mapping device 180. The mapping device 180 can store the location received from the routing device 114, along with the services offered by the provider site 110. A routing device 134, associated with the user site 130, can receive the location information for the provider site 110 (e.g., from the mapping device 180) and can determine that the provider site 110 is preferred (e.g., based on the location of the provider site 110 as compared to the location of the user site 130). The user site 130 can then use the provider site 110 for desired services (e.g., the Internet connection 102A). In an embodiment, the routing devices 114 and 134 can each be any suitable communication network device, including a suitable wired network device, a suitable WiFi routing device, a smart network interface card (NIC), a suitable cellular routing device, or any other suitable network device.

Figure 2:
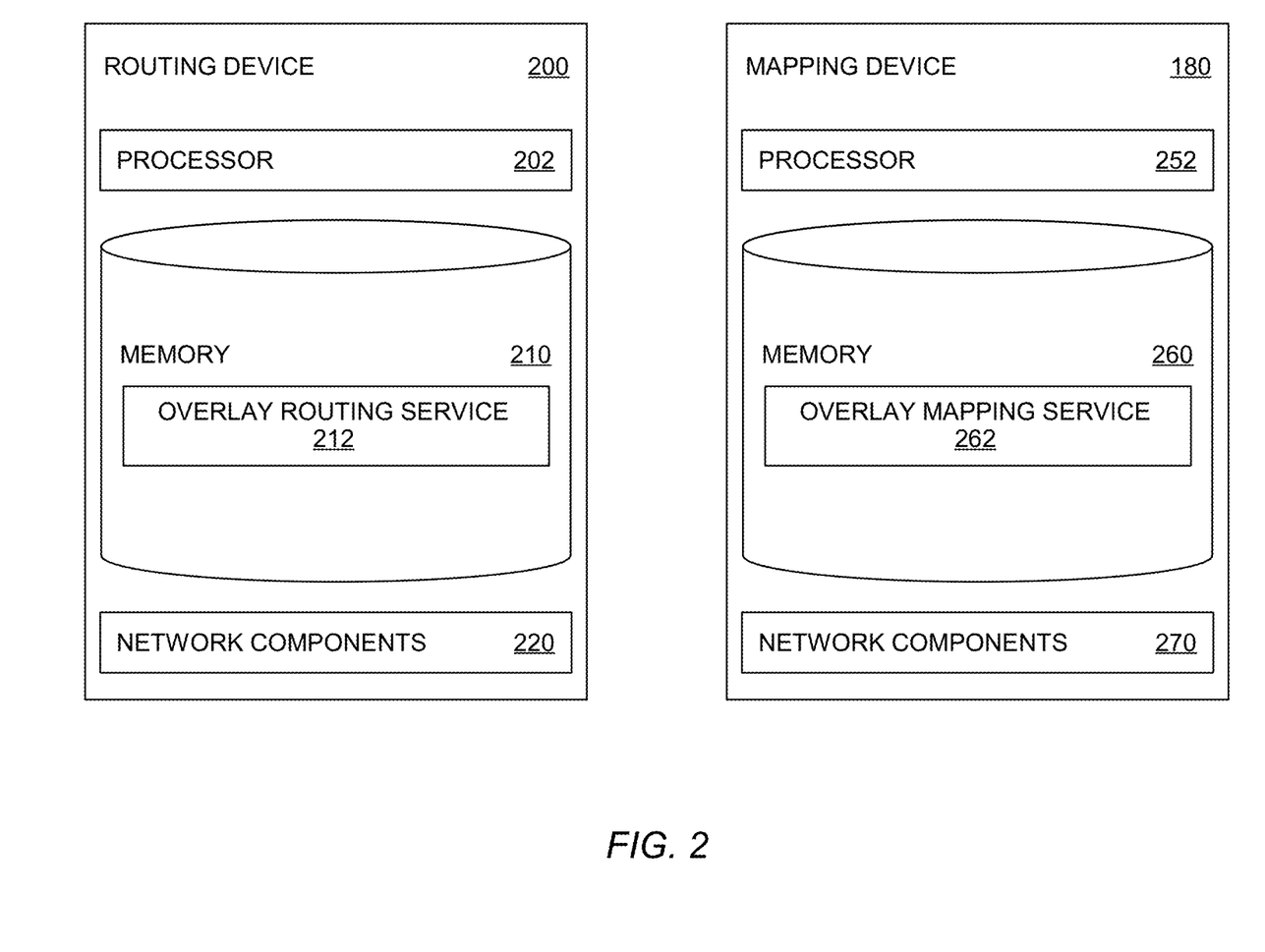
FIG. 2 illustrates block diagrams for a routing device and mapping device for service border routing based on location in multisite fabric networks, according to one embodiment.

FIG. 2 illustrates block diagrams for a routing device 200 and mapping device 180 for service border routing based on location in multisite fabric networks, according to one embodiment. In an embodiment the routing device 200 corresponds to either, or both, of the routing devices 114 and 134 illustrated in FIG. 1. The routing device 200 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the routing device 200 to interface with a suitable communication network (e.g., the computing environment 100 illustrated in FIG. 1). For example, the network components 220 can include one or more wired network devices, smart NICs, WiFi components, or cellular network interface components, and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the routing device 200. The program code is generally described as various functional "applications" or "modules" within the memory 210, although alternate implementations may have different functions and/or combinations of functions. Within the memory 210, the overlay routing service 212 facilitates service border routing based on location in multisite fabric networks. This is discussed further below with regard to FIGS. 3-7.

The mapping device 180 includes a processor 252, a memory 260, and network components 270. The memory 260 may take the form of any non-transitory computer-readable medium. The processor 252 generally retrieves and executes programming instructions stored in the memory 260. The processor 252 is representative of a single central processing unit (CPU), multiple CPUs, a single CPU having multiple processing cores, graphics processing units (GPUs) having multiple execution paths, and the like.

The network components 270 include the components necessary for the mapping device 180 to interface with a suitable communication network (e.g., the computing environment 100 illustrated in FIG. 1). For example, the network components 270 can include one or more wired network devices, smart NICs, WiFi components, or cellular network interface components, and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the mapping device 180. The program code is generally described as various functional "applications" or "modules" within the memory 260, although alternate implementations may have different functions and/or combinations of functions. Within the memory 260, the overlay mapping service 262 facilitates service border routing based on location in multisite fabric networks. This is discussed further below with regard to FIGS. 3-7.

While the routing device 200 and mapping device 180 are each illustrated as a single entity, in an embodiment, the various components can be implemented using any suitable combination of physical compute systems, cloud compute nodes and storage locations, or any other suitable implementation. For example, the routing device 200, mapping device 180, or both could be implemented using a server or cluster of servers. One or more of the components of the routing device 200, mapping device 180, or both can be implemented using a public cloud, a private cloud, a hybrid cloud, or any other suitable implementation. Further, the routing device 200, mapping device 180, or both may include one or more computing platforms, such as computer servers for example, which may be co-located, or may form an interactively linked but distributed system, such as a cloud-based system.

Further, although FIG. 2 depicts the overlay routing service 212 and the overlay mapping service 262 as being located in the respective memories 210 and 260, that representation is also merely provided as an illustration for clarity. More generally, the routing device 200, mapping device 180, or both may include one or more computing platforms, such as computer servers for example, which may be co-located, or may form an interactively linked but distributed system, such as a cloud-based system. As a result, processors 202 and 252 and memories 210 and 260, may correspond to distributed processor and memory resources within the computing environment 100. Thus, it is to be understood that the overlay routing service 212, the overlay mapping service 262, or both, may be stored remotely within the distributed memory resources of the computing environment 100.

Figure 3:
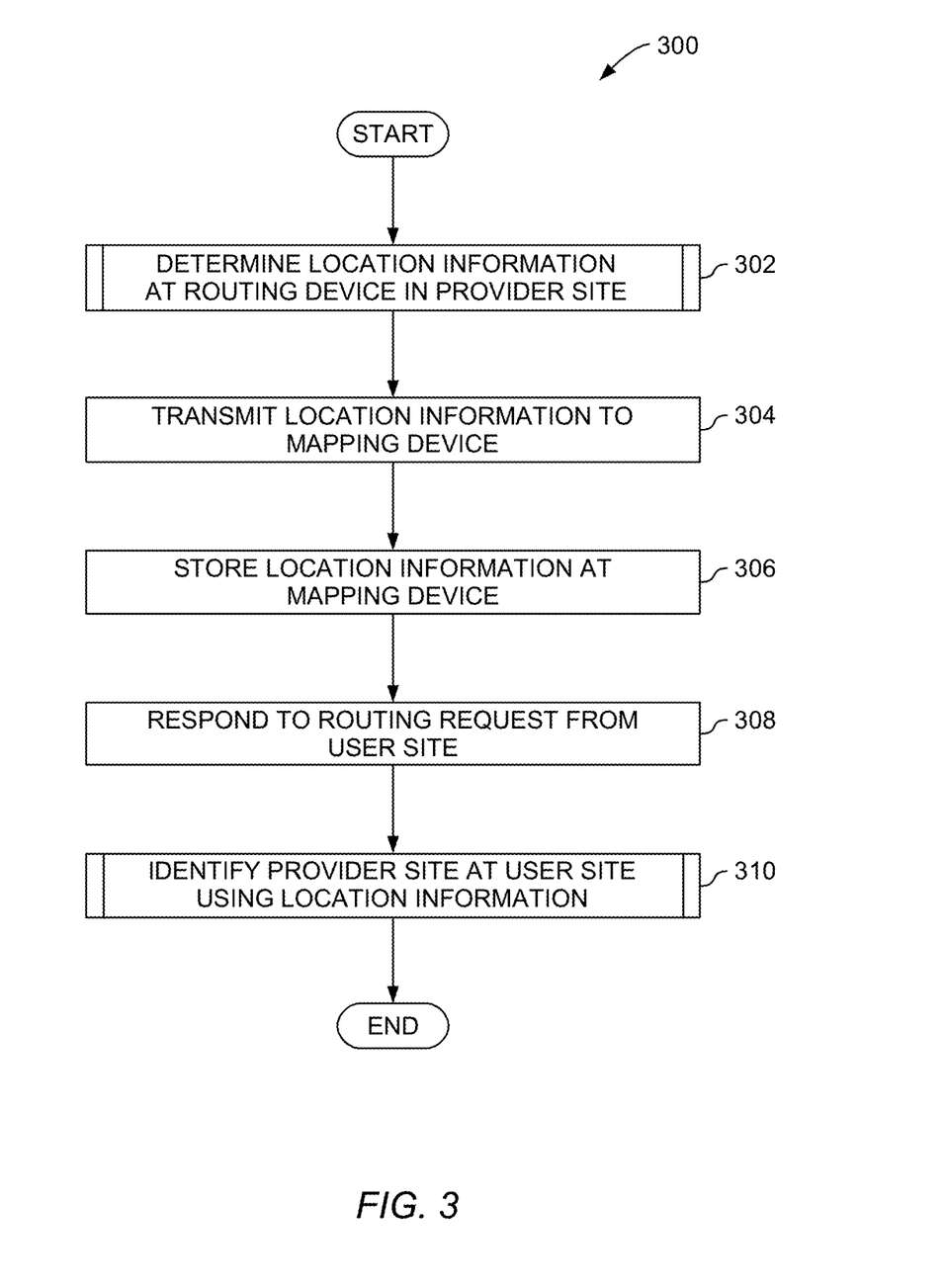
FIG. 3 is a flowchart illustrating service border routing based on location in multisite fabric networks, according to one embodiment.

FIG. 3 is a flowchart 300 illustrating service border routing based on location in multisite fabric networks, according to one embodiment. At block 302 an overlay routing service (e.g., the overlay routing service 212 illustrated in FIG. 2) determines location information at a routing device (e.g., the routing device 200 illustrated in FIG. 2) in a provider site (e.g., the provider site 110 illustrated in FIG. 1).

For example, the overlay routing service can determine routing using a latitude and longitude of the routing device, an altitude of the routing device, or any other suitable location information. This can be done by providing address information to map API, using a GPS device, WiFi or cellular radio (e.g., 5G) based location identification, or using any other suitable technique. The location information can be two dimensional (e.g., latitude and longitude), one-dimensional (e.g., a single value representing the location), more than two-dimensional (e.g., latitude, longitude, and altitude), or any other suitable value. This is discussed further, below, with regard to FIG. 4. Further, physical location information is merely one example. Alternatively, or in addition, the overlay routing service routing can be determined by another static or dynamic parameter value to use for routing (e.g., QoS information, link congestion information, loss information, delay information, or any other suitable parameter).

At block 304 the overlay routing service transmits location information to a mapping device. For example, the overlay routing service could use a modified version of an overlay protocol (e.g., a modified version of a LISP protocol) to transmit location information to a mapping device (e.g., the mapping device 180 illustrated in FIGS. 1-2).

The overlay protocol can carry the location information in a vendor specific canonical address format (e.g., a vendor specific LISP canonical address format (LCAF)). For example, the overlay routing service can associate the location information with each RLOC in a service registration message while registering to a control plane (e.g., registering to the mapping device). This is discussed further, below, with regard to FIGS. 6A-B. This is merely one example, and the overlay routing service can transmit the location information using any suitable technique to any suitable network device.

At block 306, an overlay mapping service (e.g., the overlay mapping service 262 illustrated in FIG. 2) stores the location information at the mapping device. For example, the mapping device can store latitude and longitude values with each RLOC. It can store these values in a service database (e.g., for a LISP network), or at any other suitable repository.

At block 308, the overlay mapping service responds to a routing request from a user site (e.g., the user site 130 illustrated in FIG. 1). For example, a device at a user site can request a route to a given service (e.g., an Internet connection) or destination RLOC from a mapping device. The mapping device can respond with a message including the location information for each available provider site offering the requested service (e.g., in a map reply message).

At block 310, an overlay routing service at a user site identifies a provider site using the location information for the provider site (e.g., the location information received from the mapping device). For example, the overlay routing service at the user site can find the relative proximity or distance from the user site to the provider site, based on the user site location and the provider site location. In an embodiment, the overlay routing service determines the location at the user site using the same techniques discussed above for the provider site in relation to block 302 (and illustrated further below in FIG. 4). The overlay routing service at the user site can choose the most suitable provider site, based on the distance and any other suitable factors. This is discussed further, below, with regard to FIG. 5.

Figure 4:
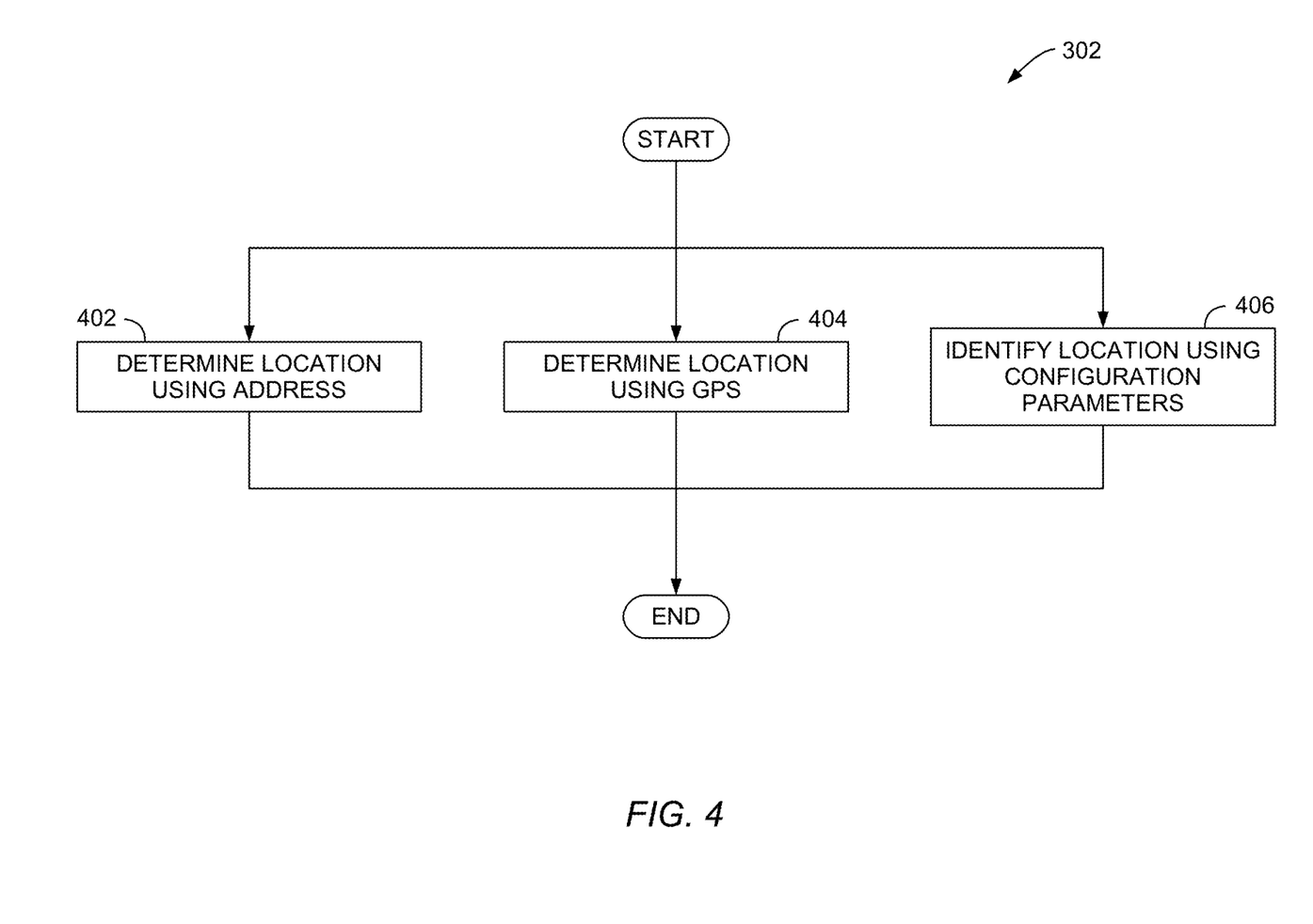
FIG. 4 is a flowchart illustrating determining location information at a routing device, according to one embodiment.

FIG. 4 is a flowchart illustrating determining location information at a routing device, according to one embodiment. In an embodiment, FIG. 4 corresponds with block 302 illustrated in FIG. 3. Further, in an embodiment, an overlay routing service (e.g., the overlay routing service 212 illustrated in FIG. 2) determines location information using one or more of several techniques.

For example, at block 402 the overlay routing service can determine location using an address for a routing device. The address of a building housing the routing device can, for example, be recorded at the routing device (or a suitable controller or other device associated with the routing device) as part of network management (e.g., using a suitable controller). For example, an RLOC in a LISP network can be assigned to a building. The address of that building can be used to determine location information (e.g., latitude and longitude). This can be done by submitting the address to a suitable map API (e.g., which returns latitude and longitude, given an address), or using any other suitable technique.

Alternatively, or in addition, at block 404 the overlay routing service can determine location using GPS or WiFi or cellular radio (e.g., 5G) based location identification. For example, a routing device can include a GPS or location device (e.g., a GPS or location chip). The routing service can use that GPS device to identify the latitude and longitude of the routing device.

As another example, at block 406 the routing service can identify the location using configuration parameters. For example, latitude and longitude can be configured into the routing device when it is setup. As another example, other values (e.g., other than latitude and longitude) can be configured into the routing device to use in place of latitude and longitude. These parameters could be used as overriding parameters, to override existing RLOC priority for the routing device. Further, these parameters could be used along with a priority value for a specific region to allow priority exit within the region. For example, if a relative distance or proximity of two different service borders of providers sites are calculated as the same, or similar (e.g., within a threshold), from a user site, priority can be used to decide which of the two available service border to use.

Figure 5:
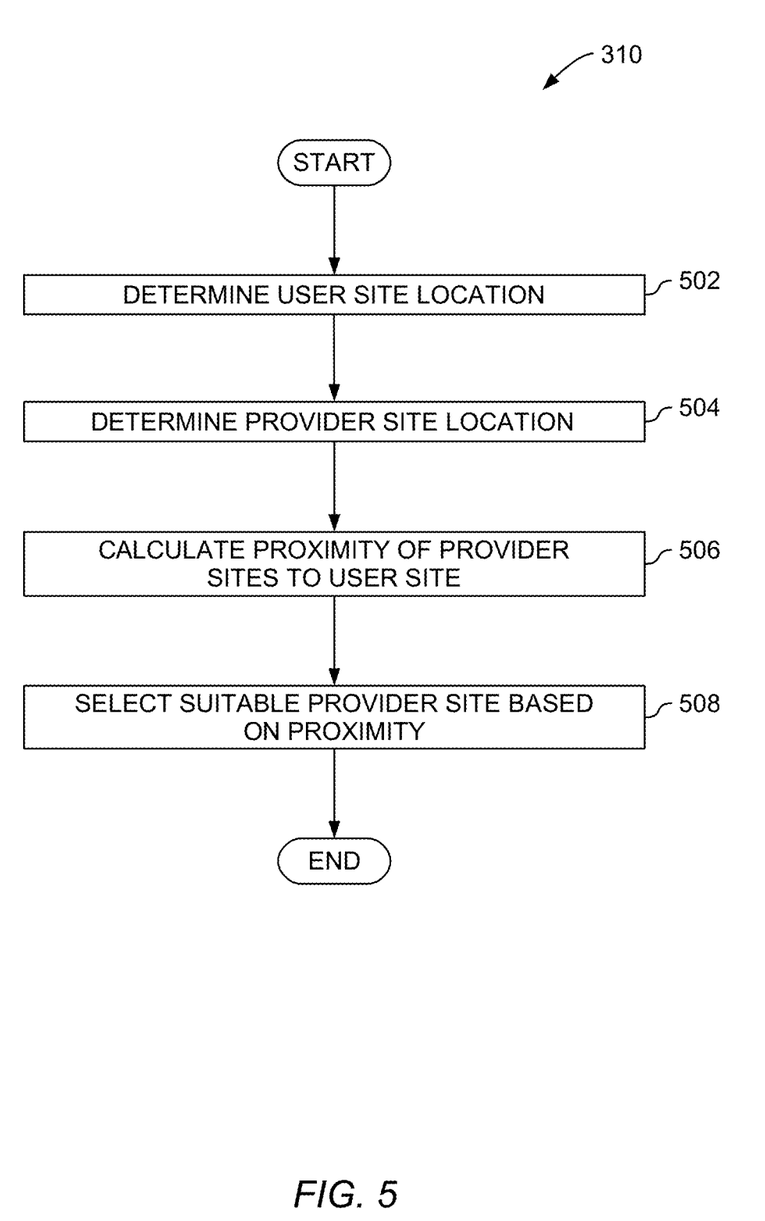
FIG. 5 is a flowchart illustrating identifying a service border destination using location, according to one embodiment.

FIG. 5 is a flowchart illustrating identifying a service border destination using location, according to one embodiment. In an embodiment, FIG. 5 corresponds with block 310 illustrated in FIG. 3. At block 502 an overlay routing service (e.g., the overlay routing service 212 illustrated in FIG. 2) determines a user site location. For example, the overlay routing service can use any of the techniques discussed with regard to FIG. 4, including determining the location using an address (e.g., using a map API), determining the location using GPS, WiFi or cellular radio (e.g., 5G) based location identification, or identifying the location using configuration parameters. This is merely one example, and the overlay routing service can use any suitable technique. Further, location information is merely one example. Alternatively, or in addition, the overlay routing service can determine another static or dynamic parameter to use for routing (e.g., QoS information, link congestion information, loss information, delay information, or any other suitable parameter).

At block 504, the overlay routing service determines provider site locations. For example, the overlay routing service can determine locations of provider sites offering a requested network service (e.g., an Internet connection, as illustrated in FIG. 1). In an embodiment, the overlay routing service receives the provider site locations in response message from a mapping device (e.g., as discussed further, above, in relation to block 308 illustrated in FIG. 3).

At block 506, the overlay routing service calculates the proximity of the provider sites to the user sites. For example, the overlay routing service can convert the location of the user site and the provider sites to corresponding measurements (e.g., latitude and longitude) and can calculate the distance between the locations. In an embodiment, the overlay routing service can do this calculation for every provider site that a mapping device identifies as offering the requested service (e.g., every provider site for which the overlay routing site knows the location).

At block 508, the overlay routing service selects a suitable provider site based on proximity. For example, the overlay routing service can select the provider site closest in distance to the user site. As another example, if two provider sites are equidistant to the user site, or close in distance (e.g., within a defined threshold of distance), the overlay routing service can use the static RLOC priority as an additional factor to select the provider site.

As discussed above, physical location is merely one example of a parameter that the overlay routing service can use to select a provider site for a given user site. Alternatively, or in addition, the overlay routing service can use any other suitable parameter (e.g., QoS information, link congestion information, loss information, delay information, or any other suitable parameter). In an embodiment, the overlay routing service uses one or more of these parameters in place of physical distance. Alternatively, the overlay routing service uses one or more of these parameters in addition to physical distance. Further, as noted above, physical distance can be represented using any suitable value or combination of values. Latitude and longitude are merely one example of a representation of physical location.

Figure 6A:
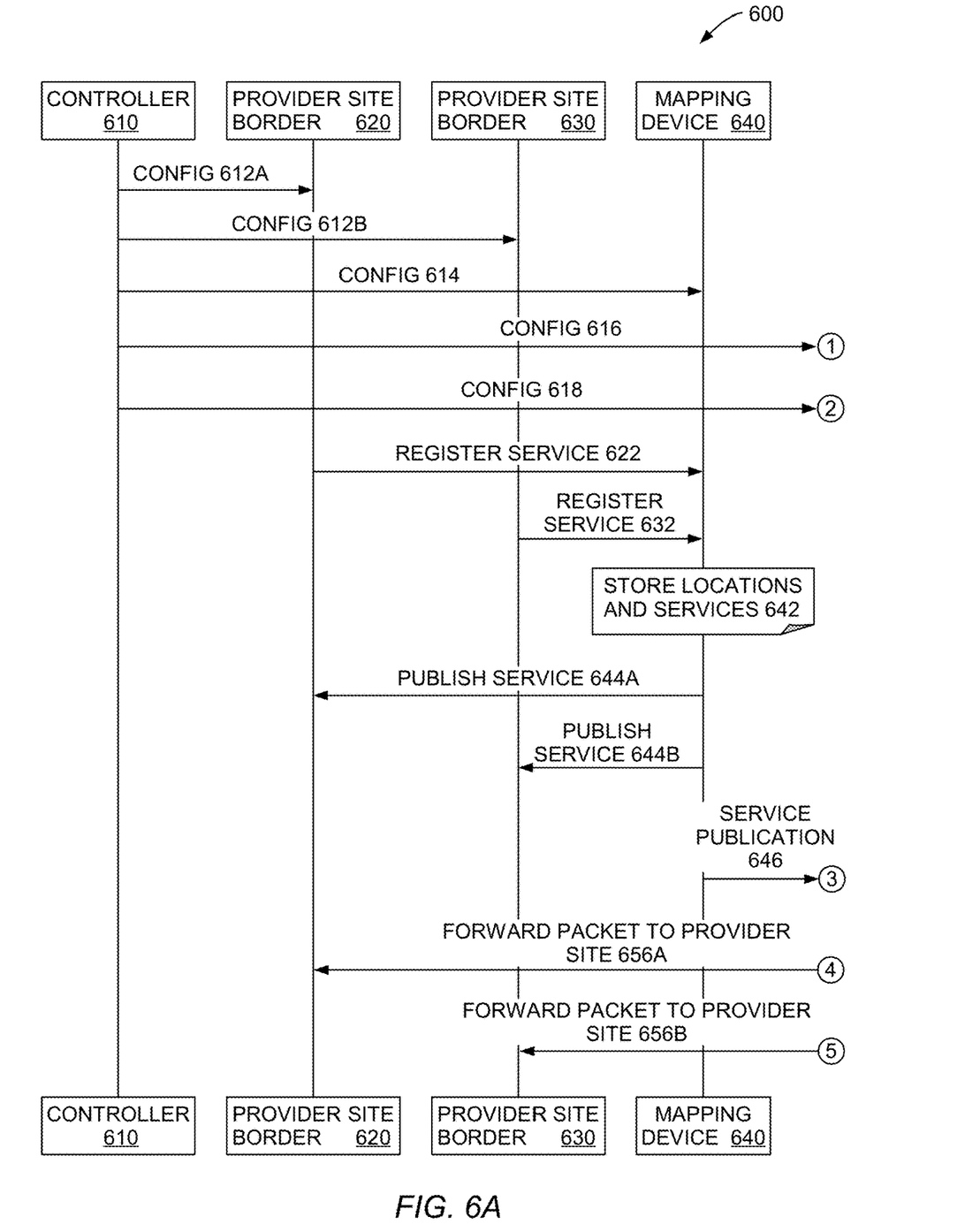
FIGS. 6A-B are a message diagram illustrating service border routing based on location in multisite fabric networks, according to one embodiment.
Figure 6B:
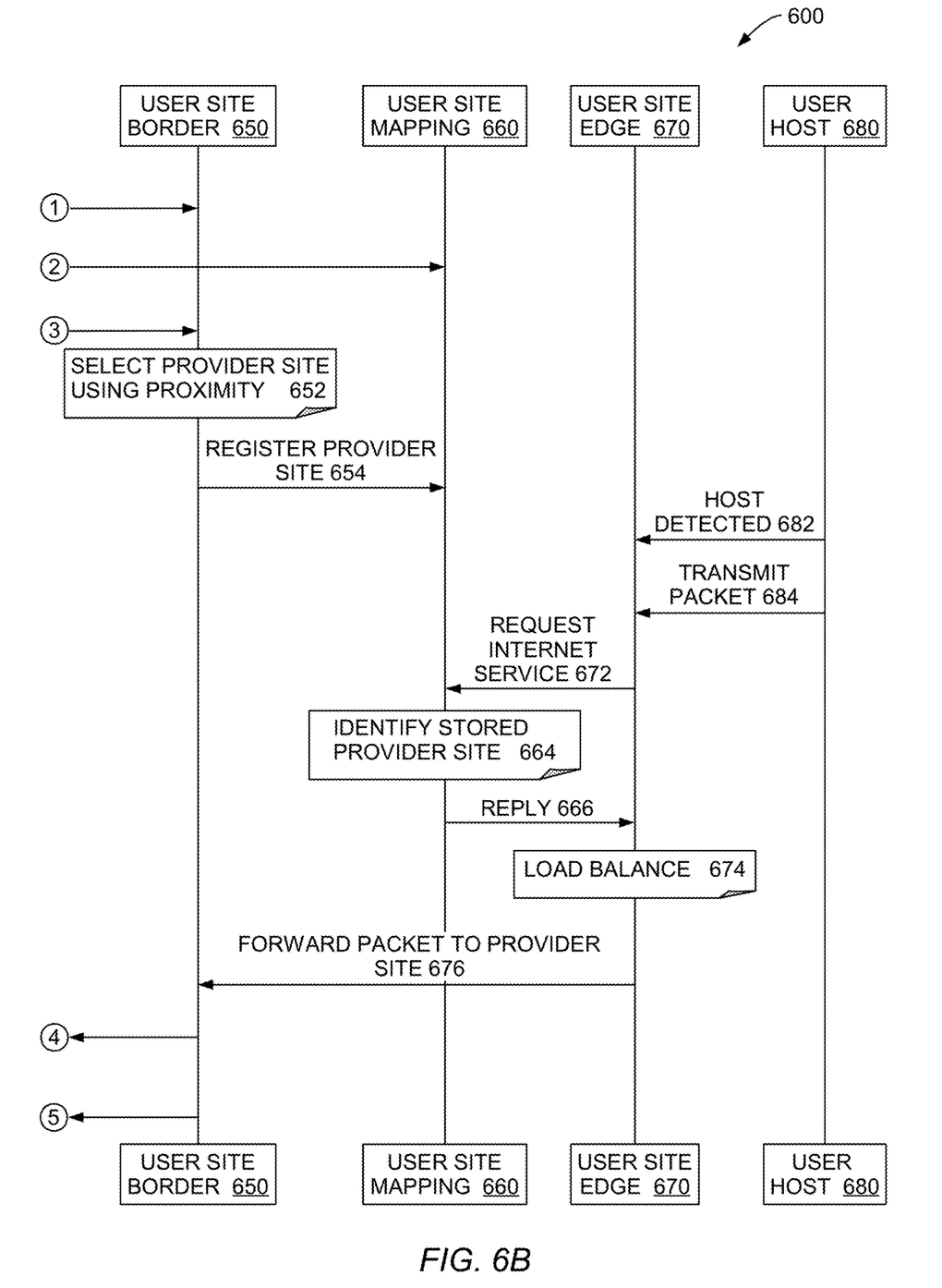

FIGS. 6A-B are a message diagram 600 illustrating service border routing based on location in multisite fabric networks, according to one embodiment. In an embodiment, a controller 610 (e.g., a network controller) controller 610 is responsible for configuring network devices, and transmits a series of configuration messages to various devices in the network. For example, the controller 610 transmits a first configuration (e.g., to register a service border) message 612A to a first provider site border 620 (e.g., the border 112 for the provider site 110 illustrated in FIG. 1) and transmits a second configuration (e.g., to register a service border) message 612B to a second provider site border 630 (e.g., the border 122 for the provider site 120 illustrated in FIG. 1). The configuration (to register a service border) messages 612A and 612B can be transmitted from the controller 610 to the respective provider site borders 620 and 630 to register available services at those provider sites (e.g., Internet services, or any other suitable services).

The controller 610 further transmits a configuration (e.g., to accept registration from service borders) message 614 to a mapping device 640 (e.g., the mapping device 180 illustrated in FIG. 1), a configuration (e.g., to subscribe to a service border) message 616 to a user site border 650 (e.g., the border 132 for the user site 130 illustrated in FIG. 1), and a configuration (e.g., to accept registration from service borders) message 618 to a user site mapping device 660 (e.g., a local device for mapping within the user site 130 illustrated in FIG. 1). For example, the configuration accept message 614 can be a device programmability model (e.g., yang or protocol buffer (protobuf)) based configuration message to accept service registrations, the configuration message 616 can be a configuration message to subscribe for services, and the configuration message 618 can be a device programmability (e.g., yang or protobuf) model based configuration message to accept service registrations.

In an embodiment, after the controller 610 transmits the configuration messages 612A, 612B, 614, 616, and 618, the provider site border 620 transmits a register service message 622 to the mapping device 640 and the provider site border 630 transmits a register service message 632 to the mapping device 640. For example, the register service messages 622 and 632 can identify service capabilities for the respective provider site borders 620 and 630 to the mapping device 640.

Further, in an embodiment, the register service messages 622 and 632 can include the locations of the provider site borders 620 and 630. For example, as discussed above in relation to blocks 302 and 304 illustrated in FIG. 3, the provider sites can determine their locations using any of a number of techniques, and can transmit that location information to the mapping device 640.

At block 642, the mapping device 640 then stores the locations and services (e.g., as discussed above in relation to block 306 illustrated in FIG. 3). The mapping device 640 further transmits publish service messages 644A and 644B back to the provider site borders 620 and 630.

The mapping device 640 then transmits a service publication message 646 to the user site border 650. In an embodiment, the service publication message 646 includes both available services at the provider site borders 620 and 630, and the locations of the provider site borders 620 and 630.

At block 652, the user site border 650 selects a provider site for the offered services using proximity (e.g., as discussed above in relation to block 310 illustrated in FIG. 3). The user site border 650 then transmits a register provider site message 654 to the user site mapping device 660. In an embodiment, the user site mapping device 660 can further store the selected provider site. Alternatively, the user site mapping device 660 can store the selected provider site instead of the user site border 650 storing the selected provider site. The user site mapping device 660 can also select a provider site, in place of or in addition to the user site border 650.

A user host 680 (e.g., a user computing device, including a laptop computer, desktop computer, smartphone, tablet, wearable device, head mounted display, internet of things (IoT) device, or any other suitable computing device) transmits a host detected message 682 to a user site edge 670 (e.g., an edge device in the user site 130 illustrated in FIG. 1). In an embodiment, the host detected message 682 indicates to the user site edge 670 that the user host 680 has been detected.

The user host 680 then transmits a packet 684 (e.g., a packet including data for transmission over the Internet) to the user site edge 670. The user site edge 670 transmits a request for Internet service 672 to the user site mapping 660. In an embodiment, the request for Internet service 672 indicates that the user host 680, the user site edge 670, or both, are requesting Internet service (e.g., through a provider site).

At block 664, the user site mapping device 660 identifies the stored provider site. For example, the user site mapping device 660 earlier received an identifier for a selected provider site in the register provider site message 654 received from the user site border 650. In an embodiment, at block 664 the user site mapping device 660 identifies the received provider site.

The user site mapping device 660 then transmits a reply 666 identifying the provider site. At block 674 the user site edge 670 load balances. For example, the user site edge 670 can determine that multiple provider sites are suitable, or that a preferred provider site is overloaded, and can identify a different provider site to provider the Internet service. This is optional, and in an embodiment the user site edge 670 identifies the provider site identified in the reply 666 from the user site mapping device 660.

The user site edge 670 then forwards the packet to the provider site by transmitting a message 676 to the user site border 650. The user site border 650 transmits the packet to the desired destination provider site (e.g., the provider site selected to provide Internet service using the proximity of the provider site to the user site border 650) in either a message 656A or 656B. In an embodiment, the user site border transmits traffic via either message 656A or message 656B, depending on the selected provider site, but does not transmit to both.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   transmitting a second dynamic parameter value from a second site in an overlay communication network to a mapping device associated with the overlay communication network;
   storing the second dynamic parameter value at the mapping device;

retrieving the second dynamic parameter value at the mapping device based on a received network message associated with a first site in the overlay communication network;

transmitting the retrieved second dynamic parameter value from the mapping device to a first routing device at the first site and relating to a service border for the first site;

receiving, at the first routing device, the second dynamic parameter value for a second routing device at the second site and a third dynamic parameter value for a third routing device at a third site in the overlay communication network, wherein the second site and the third site are each configured to provide a first network service for a computing device in the first site;

selecting the second site in the overlay communication network by overriding a prioritization of the second site and the third site at the first site based on a first dynamic parameter value of the first routing device at the first site, the second dynamic parameter value of the second routing device at the second site, and the third dynamic parameter value of the third routing device at the third site; and providing, for the computing device, the first network service from the second routing device at the second site to the first routing device at the first site, based on selecting the second site.

2. The method of claim 1, wherein the first dynamic parameter value comprises a first geographic location and the second dynamic parameter value comprises a second geographic location.

3. The method of claim 2, wherein the first geographic location and the second geographic location each comprise a latitude value and a longitude value.

4. The method of claim 2, wherein selecting the second site comprises:
determining a first geographic distance between the first geographic location and the second geographic location;
determining a second geographic distance between the first geographic location and a third geographic location of the third site; and
selecting the second site based on determining that the first geographic distance is closer than the second geographic distance.

5. The method of claim 2, wherein the second site determines the second geographic location using at least one of: (i) an address associated with the second site, (ii) a global positioning system (GPS) associated with the second site, (iii) WiFi based location identification, or (iv) 5G based location identification.

6. The method of claim 1, wherein the first dynamic parameter and the second dynamic parameter each comprise at least one of: (i) quality of service (QOS) information, (ii) link congestion information, (iii) loss information, or (iv) delay information.

7. The method of claim 1, wherein the overlay communication network comprises a Locator ID Separation Protocol (LISP) network.

8. The method of claim 7, wherein the mapping device comprises Map Server Map Resolver (MSMR) or at least one of a map resolver (MR) or a map server (MS) for the LISP network.

9. The method of claim 7, wherein the second dynamic parameter value is transmitted from the second site to the mapping device using a vendor specific LISP canonical address format (LCAF).

10. A system, comprising:
a processor; and
a memory having instructions stored thereon which, when executed on the processor, performs an operation comprising:
transmitting a second dynamic parameter value from a second site in an overlay communication network to a mapping device associated with the overlay communication network;
storing the second dynamic parameter value at the mapping device;
retrieving the second dynamic parameter value at the mapping device based on a received network message associated with a first site in the overlay communication network;
transmitting the retrieved second dynamic parameter value from the mapping device to a first routing device at the first site and relating to a service border for the first site;
receiving, at the first routing device, the second dynamic parameter value for a second routing device at the second site and a third dynamic parameter value for a third routing device at a third site in the overlay communication network, wherein the second site and the third site are each configured to provide a first network service for a computing device in the first site;
selecting the second site in the overlay communication network by overriding a prioritization of the second site and the third site at the first site based on a first dynamic parameter value of the first routing device at the first site, the second dynamic parameter value of the second routing device at the second site, and the third dynamic parameter value of the third routing device at the third site; and
providing, for the computing device, the first network service from the second routing device at the second site to the first routing device at the first site based on selecting the second site.

11. The system of claim 10, wherein the first dynamic parameter value comprises a first geographic location and the second dynamic parameter value comprises a second geographic location.

12. The system of claim 11, wherein selecting the second site comprises:
determining a first geographic distance between the first geographic location and the second geographic location;
determining a second geographic distance between the first geographic location and a third geographic location of the third site; and
selecting the second site based on determining that the first geographic distance is closer than the second geographic distance.

13. A non-transitory computer-readable medium having instructions stored thereon which, when executed by a processor, performs an operation comprising:
transmitting a second dynamic parameter value from a second site in an overlay communication network to a mapping device associated with the overlay communication network;
storing the second dynamic parameter value at the mapping device;
retrieving the second dynamic parameter value at the mapping device based on a received network message associated with a first site in the overlay communication network;

transmitting the retrieved second dynamic parameter value from the mapping device to a first routing device at the first site and relating to a service border for the first site;

receiving, at the first routing device, the second dynamic parameter value for a second routing device at the second site and a third dynamic parameter value for a third routing device at a third site in the overlay communication network, wherein the second site and the third site are each configured to provide a first network service for a computing device in the first site;

selecting the second site in the overlay communication network by overriding a prioritization of the second site and the third site at the first site based on a first dynamic parameter value of the first routing device at the first site, the second dynamic parameter value of the second routing device at the second site, and the third dynamic parameter value of the third routing device at the third site; and providing, for the computing device, the first network service from the second routing device at the second site to the first routing device at the first site based on selecting the second site.

14. The non-transitory computer-readable medium of claim 13, wherein the first dynamic parameter value comprises a first geographic location and the second dynamic parameter value comprises a second geographic location.

15. The non-transitory computer-readable medium of claim 14, wherein selecting the second site comprises:

determining a first geographic distance between the first geographic location and the second geographic location;

determining a second geographic distance between the first geographic location and a third geographic location of the third site; and selecting the second site based on determining that the first geographic distance is closer than the second geographic distance.

\* \* \* \* \*